United States Patent [19]
Kluge, Jr.

[11] 3,981,376
[45] Sept. 21, 1976

[54] VEHICLE PROTECTION MEANS

[75] Inventor: Albert E. Kluge, Jr., Bloomingdale, Ill.

[73] Assignee: Caterpillar Tractor Co., Peoria, Ill.

[22] Filed: Sept. 22, 1975

[21] Appl. No.: 615,261

[52] U.S. Cl. .................. 180/70 P; 74/609
[51] Int. Cl.² ......................... B60K 17/22
[58] Field of Search............. 180/70 R, 70 P, 44 R, 180/82 R, 51; 74/608, 609; 64/32

[56] References Cited
UNITED STATES PATENTS

| | | |
|---|---|---|
| 2,775,905 | 1/1957 | Jackson .............................. 74/609 |
| 2,835,397 | 5/1958 | Wagner .............................. 180/51 X |
| 2,904,905 | 9/1959 | Armington ..................... 180/44 R X |
| 3,175,636 | 3/1965 | Winkelmann .................. 180/70 P |
| 3,415,457 | 12/1968 | Echols ............................. 74/608 X |
| 3,455,409 | 7/1969 | Clark ............................... 180/82 R |
| 3,504,508 | 4/1970 | Bornzin ........................... 64/32 R X |

*Primary Examiner*—Kenneth H. Betts
*Attorney, Agent, or Firm*—Frank L. Hart

[57] ABSTRACT

A vehicle having a drive shaft and a "U" joint positioned adjacent a transmission housing has a protection element positioned between the "U" joint and the transmission housing to protect the transmission housing from damage.

6 Claims, 3 Drawing Figures

U.S. Patent    Sept. 21, 1976    3,981,376
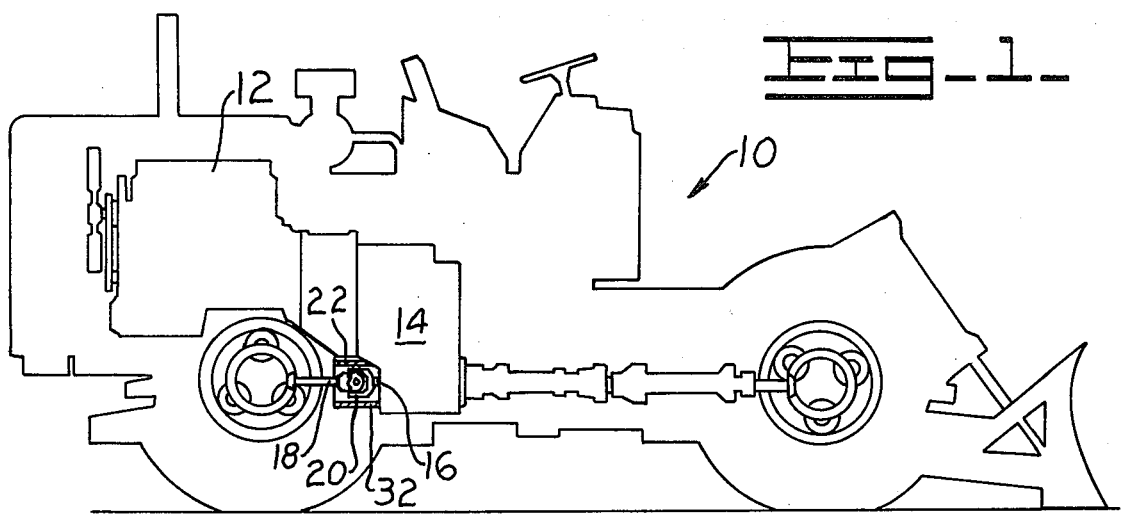
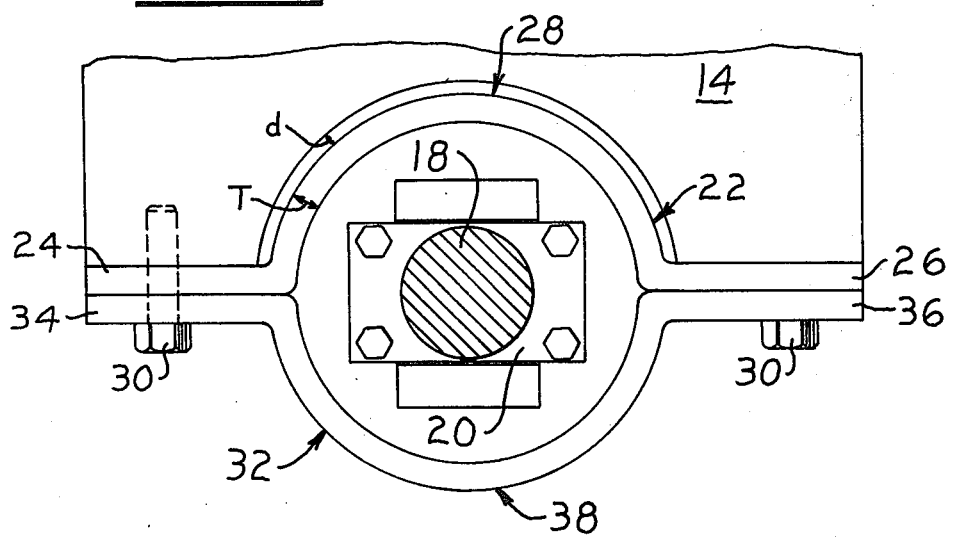
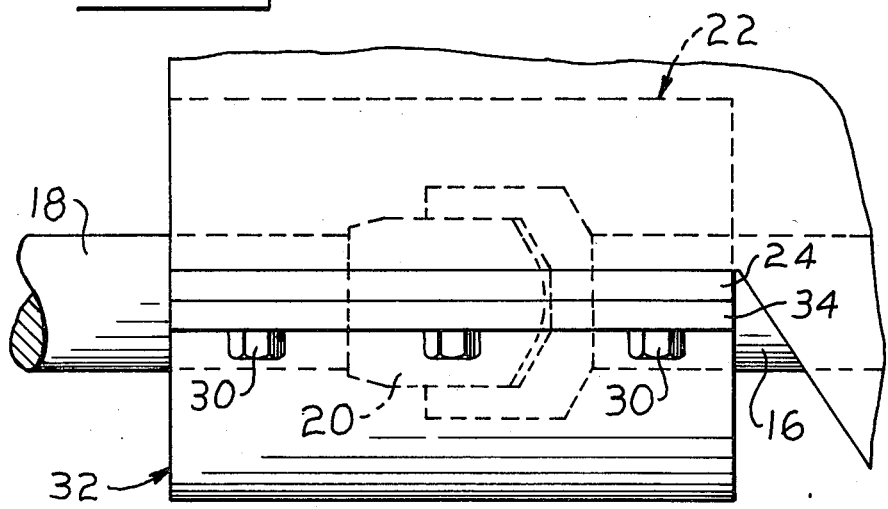

VEHICLE PROTECTION MEANS

BACKGROUND OF THE INVENTION

Vehicles having a drive shaft coupled to wheels of the vehicle sometimes have a "U" joint of the drive shaft positioned immediately adjacent the transmission housing. As is known in the art, the "U" joint is generally considered a weaker portion of the drive train of the vehicle. Under repeated heavy loads or after considerable wear, the "U" joint or associated equipment sometimes breaks and/or malfunctions and permits the "U" joint to rotate in contact with the transmission housing or impact said housing.

It is therefore desirable to provide an impact barrier element between the "U" joint and the transmission housing to prevent the "U" joint from damaging the transmission housing and power train elements positioned in the housing. Further, it is desirable to provide a barrier of a construction that will withstand abrasion and/or impacts of a high magnitude.

BRIEF DESCRIPTION OF THE DRAWINGS

FIG. 1 is a diagrammatic view of a vehicle having the apparatus of this invention;

FIG. 2 is a diagrammatic partial frontal view of the apparatus of this invention; and FIG. 3 is a diagrammatic side view of the apparatus of this invention.

DETAILED DESCRIPTION OF THE INVENTION

Referring to FIG. 1, a vehicle 10, such as an earth compactor, for example, has a power means 12, a transmission housing 14, a power train within the transmission housing 14, and a drive shaft 18 connected to the output shaft 16 of the power train through a "U" joint 20 positioned adjacent the transmission housing 14.

Referring to FIGS. 2 and 3, an impact barrier element 22 has first and second flanges 24, 26 connected to the transmission housing 14 on opposed sides of the "U" joint 20. A middle portion 28 of the impact barrier element 22 connects the flanges 24, 26 and extends between the transmission housing 14 and the "U" joint 20. The middle portion 28 can be of generally arcuate configuration and is spaced a preselected distance $d$ from the transmission housing 14.

The middle portion 28 of the impact barrier element 22 is spaced from the transmission housing a distance $d$ of at least 0.4 cm. Distances $d$ less than about 0.4 cm. are undesirable because the sometimes severe impact delivered by the "U" joint is of a magnitude sufficient to drive the barrier element into the transmission housing with a force sufficient to damage said housing.

In order to assure that the impact barrier element 22 will withstand the large amount of impact and/or abrasion that it may receive from a malfunctioning "U" joint 20, it is preferred that the middle portion 28 be formed of steel, have a cross-sectional thickness of at least 0.7 cm., and be connected by bolts 30 passing through the flanges 24, 26 and into the transmission housing 14.

In order to further protect the transmission housing 14 and associated equipment of the vehicle 10, it is preferred that a retaining element 32 be associated with the "U" joint 20 and connected to the impact barrier element 22.

In the preferred embodiment, the retaining element 32 has first and second flanges 34, 36 connected to respective flanges 24, 26 of the impact barrier element 22. A middle portion 38 of the retaining element 32 connects the flanges 34, 36 and extends about the lower portion of the "U" joint 20.

The impact barrier element 22 with the retaining element 32, in the installed position, encompass and are spaced from the "U" joint 20.

In the preferred embodiment, the flanges 34, 36 of the retaining element 32 are connected to respective flanges 24, 26 of the impact barrier element 22 by bolts 30, passing through both associated flanges 24, 34 and 26, 36 and into the transmission housing 14.

By so constructing the apparatus of this invention, the transmission 16, transmission housing 14, and associated, adjacently positioned apparatus of the vehicle are protected from damage if the "U" joint fails and provide for flexture of the barrier element for absorbing impact forces from the "U" joint.

Other aspects, object and advantages will become apparent from a study of the drawings, the disclosure, and the appended claims.

What is claimed is:

1. A vehicle, comprising:
   a power means;
   a transmission housing;
   a power train positioned in the housing;
   a drive shaft connected to the power train, said drive shaft having a "U" joint positioned adjacent and beneath a portion of the transmission housing; and
   an impact barrier element positioned between the "U" joint and the overlaying transmission housing, said element having first and second flanges connected to the transmission housing and a middle portion connecting said flanges and being spaced a preselected distance from the transmission housing.

2. A vehicle, as set forth in claim 1, wherein the middle portion of the impact barrier element is spaced from the transmission housing a distance of at least 0.4 cm.

3. A vehicle, as set forth in claim 1, wherein the middle portion of the impact barrier element is formed of steel and has a cross-sectional thickness of at least 0.7 cm.

4. A vehicle, as set forth in claim 1, wherein the flanges of the impact barrier element are connected to the transmission housing by bolts extending through the flanges and into the transmission housing.

5. A vehicle, as set forth in claim 1, including
   a retaining element having first and second flanges connected to respective flanges of the impact barrier element and a middle portion connecting the retaining element flanges and extending about and spaced from a lower portion of said "U" joint, said impact barrier element with said retaining element encompassing said "U" joint.

6. A vehicle, as set forth in claim 5, wherein the first and second retaining element flanges are connected to respective impact barrier element flanges by bolts passing through the overlying flanges and into the transmission housing.

* * * * *